United States Patent
Kondou et al.

(10) Patent No.: US 7,028,466 B2
(45) Date of Patent: Apr. 18, 2006

(54) REGENERATION OF DIESEL PARTICULATE FILTER

(75) Inventors: Terunori Kondou, Yokohama (JP);
Junichi Kawashima, Yokosuka (JP);
Naoya Tsutsumoto, Yokohama (JP);
Makoto Otake, Yokohama (JP); Takao Inoue, Yokohama (JP); Toshimasa Koga, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 113 days.

(21) Appl. No.: 10/756,502

(22) Filed: Jan. 14, 2004

(65) Prior Publication Data

US 2004/0144087 A1    Jul. 29, 2004

(30) Foreign Application Priority Data

Jan. 16, 2003   (JP) ............................ 2003-007939

(51) Int. Cl.
*F01N 3/00* (2006.01)
(52) U.S. Cl. ............................ 60/295; 60/285; 60/297; 60/311
(58) Field of Classification Search .................. 60/280, 60/285, 286, 295, 297, 303, 311
See application file for complete search history.

(56) References Cited

U.S. PATENT DOCUMENTS

| 4,685,290 | A |   | 8/1987 | Kamiya et al. | |
|---|---|---|---|---|---|
| 4,835,964 | A | * | 6/1989 | Kume et al. | 60/285 |
| 5,319,930 | A | * | 6/1994 | Shinzawa et al. | 60/286 |
| 6,032,461 | A | * | 3/2000 | Kinugasa et al. | 60/295 |
| 6,247,311 | B1 |   | 6/2001 | Itoyama et al. | |
| 6,304,815 | B1 | * | 10/2001 | Moraal et al. | 701/115 |
| 6,698,192 | B1 | * | 3/2004 | Ootake | 60/297 |
| 6,708,487 | B1 | * | 3/2004 | Morimoto et al. | 60/311 |
| 6,901,751 | B1 | * | 6/2005 | Bunting et al. | 60/297 |

FOREIGN PATENT DOCUMENTS

| DE | 100 33 159 A1 | 1/2002 |
|---|---|---|
| EP | 1 195 508 A2 | 4/2002 |
| EP | 1 203 877 A1 | 5/2002 |
| EP | 1 437 497 A1 | 7/2004 |
| JP | 5-044437 A | 2/1993 |

OTHER PUBLICATIONS

U.S. Appl. No. 10/752,427, filed Jan. 7, 2004, Inoue et al.
U.S. Appl. No. 10/752,518, filed Jan. 8, 2004, Koga et al.
U.S. Appl. No. 10/752,519, filed Jan. 8, 2004, Koga et al.
U.S. Appl. No. 10/751,883, filed Jan. 7, 2004, Inoue et al.
U.S. Appl. No. 10/755,316, filed Jan. 13, 2004, Otake et al.
U.S. Appl. No. 10/751,940, filed Jan. 7, 2004, Inoue et al.

* cited by examiner

*Primary Examiner*—Binh Q. Tran
(74) *Attorney, Agent, or Firm*—Foley & Lardner LLP

(57) ABSTRACT

A filter (41) traps particulate matter in the exhaust gas of a vehicle diesel engine (1). A vehicle speed sensor (51) detects a vehicle speed, and a controller (31) determines a vehicle running pattern from the vehicle speed. In the regeneration of the filter (41) to eliminate trapped particulate matter by burning, the controller (31) controls the exhaust gas temperature of the diesel engine (1) to a different target temperature according to the running pattern. As a result, there are less opportunities for regeneration of the filter (41) to be interrupted due to exhaust gas temperature drop, and regeneration of the filter (41) is ensured.

13 Claims, 8 Drawing Sheets

32 ACCELERATOR PEDAL DEPRESSION SENSOR
33 CRANK ANGLE SENSOR
34 COOLANT TEMPERATURE SENSOR
35 AIR FLOWMETER
36 DIFFERENTIAL PRESSURE SENSOR
37,38 TEMPERATURE SENSOR
51 VEHICLE SPEED SENSOR

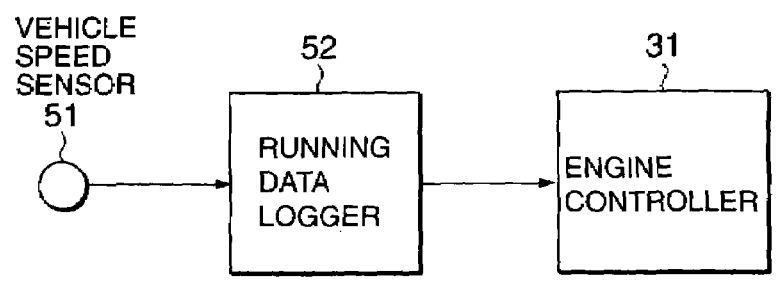
FIG.2

FIG.6B REGENERATION MODE FLAG 

REGENERATION OF DIESEL PARTICULATE FILTER

FIELD OF THE INVENTION

This invention relates to regeneration of a diesel particulate filter for a diesel engine for vehicles.

BACKGROUND OF THE INVENTION

Tokkai Hei 05-44437 published by Japan Patent Office in 1993 discloses a device which processes particulate matter contained in the exhaust gas discharged from a vehicle diesel engine.

This device comprises a diesel particulate filter (DPF) which traps the particulate matter in the exhaust passage of the diesel engine. When a predetermined amount of particulate matter deposits on the DPF, the particulate matter is burnt by increasing exhaust gas temperature by operating the intake throttle so as to raise the temperature of the DPF. This treatment is called regeneration treatment of the DPF.

SUMMARY OF THE INVENTION

Regeneration treatment may be interrupted while a large amount of particulate matter remain deposited in the DPF. In the DPF, when regeneration is interrupted, particulate matter remains on the outer circumference of the upstream part of the DPF which has a low bed temperature and cannot be re-burnt. If the interruption is repeated several times, there may be a part of the DPF where the deposition amount is far in excess of the maximum deposition. As a result, the temperature gradient inside the DPF during the regeneration will become large and will have an undesirable effect on the heat resistance of a filter.

The main cause of interruption of regeneration is that during regeneration of DPF, the temperature of the exhaust gas becomes less than the temperature required for regeneration of the DPF. For regeneration of the DPF, the vehicle needs to run continuously in almost the same state during the whole time required for regeneration.

The running patterns of the vehicle include high speed running, low vehicle speed running as in urban areas, and a running pattern which is intermediate between high speed running and low speed running as in suburban areas. If regeneration of the DPF is performed uniformly during these different running patterns, the opportunity for interruption of DPF regeneration will inevitably increase.

It is therefore an object of this invention to reduce the interruption of regeneration of the DPF, and as a result, to increase the rate of successful completion of the DPF regeneration.

In order to achieve the above object, this invention provides a regeneration device for a filter which traps particulate matter in the exhaust gas of a vehicle diesel engine. The regeneration device comprises a sensor which detects a vehicle running condition, an exhaust gas temperature increasing mechanism which increases a temperature of the exhaust gas, and a programmable controller programmed to determine a vehicle running pattern from the vehicle running condition, and control the exhaust gas temperature increase mechanism to increase the exhaust gas temperature to a target temperature according to the vehicle running pattern.

This invention also provides a regeneration method of a filter which traps particulate matter in the exhaust gas of a vehicle diesel engine. The engine comprises an exhaust gas temperature increasing mechanism which increases a temperature of the exhaust gas. The method comprises determining a vehicle running condition, determining a vehicle running pattern from the vehicle running condition, and controlling the exhaust gas temperature increase mechanism to increase the exhaust gas temperature to a target temperature according to the vehicle running pattern.

The details as well as other features and advantages of this invention are set forth in the remainder of the specification and are shown in the accompanying drawings.

BRIEF DESCRIPTION OF THE DRAWINGS

FIG. 2 is a block diagram describing a construction of the exhaust gas purification device with respect to the recognition of vehicle running patterns.

FIGS. 6A and 6B are histograms describing a relation of the vehicle running pattern with the regeneration mode determined by the engine controller.

DESCRIPTION OF THE PREFERRED EMBODIMENTS

Figure 1:
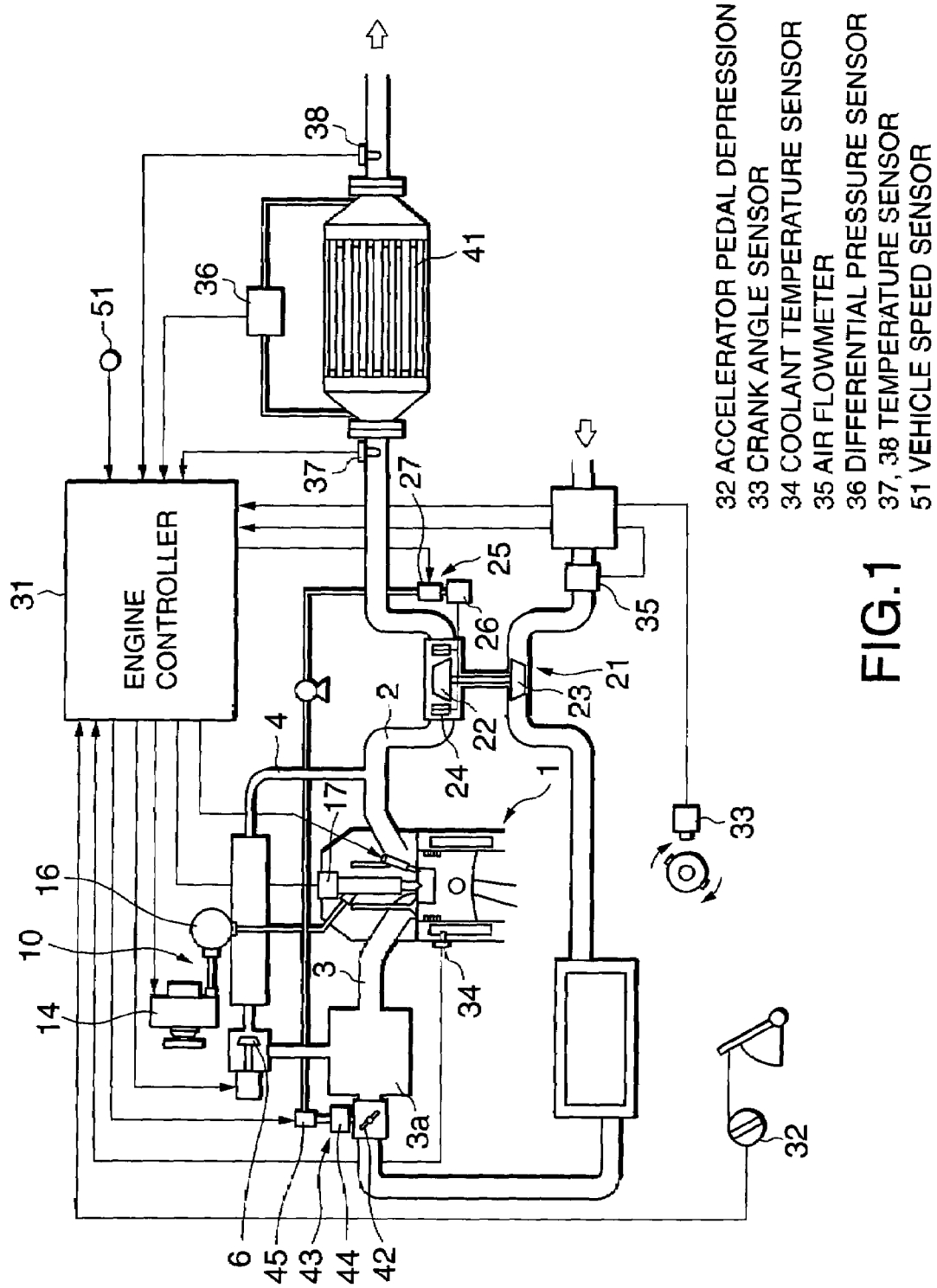
FIG. 1 is a schematic diagram of an exhaust gas purification device according to this invention.

Referring to FIG. 1 of the drawings, a multi-cylinder diesel engine 1 for vehicles is provided with an exhaust passage 2 and intake passage 3. The intake passage 3 is provided with a collector part 3a to distribute intake air to each cylinder. The exhaust passage 2 and the collector part 3a are connected by an exhaust gas recirculation (EGR) passage 4.

A diaphragm type EGR valve 6 is installed in the EGR passage 4. The EGR valve 6 is operated by a pressure limiting valve and diaphragm-type actuator according to a duty signal from an engine controller 31.

The engine 1 is provided with a common rail fuel injection device 10. The fuel injection device 10 is provided with a supply pump 14, common rail (accumulator) 16 and nozzle 17 provided for every cylinder. Fuel pressurized by the supply pump 14 is distributed to each nozzle 17 via the common rail 16.

The nozzle 17 is provided with a needle valve, nozzle chamber, fuel supply passage leading to the nozzle chamber, a retainer, a hydraulic piston and a return spring.

A three-way valve is a valve which selectively connects the common rail 16 and a drain to the fuel supply passage, and in the OFF state, maintains the needle valve in the seated position by the high-pressure fuel pressure of the common rail 16 via the fuel supply passage and the nozzle chamber. In the ON state, by releasing this pressure to the drain, the needle valve is lifted and the fuel in the nozzle chamber is injected into the cylinder. The engine 1 burns the injected fuel in the cylinder by compression ignition.

The fuel injection timing of the nozzle 17 is determined by the change-over timing from OFF to ON of the three-way valve, and the fuel injection amount is determined by the duration of the ON state of the three-way valve. If the pressure of the common rail 16 is identical, the fuel injection amount will increase as the duration of the ON state increases. ON and OFF of the three-way valve are changed over by a signal from the engine controller 31.

This type of common rail fuel injection device 10 is known from U.S. Pat. No. 6,247,311.

A turbine 22 of a variable capacity turbocharger 21 is provided in the exhaust passage 2 downstream of the EGR passage 4. The variable capacity turbocharger 21 is further provided with a compressor 23 installed in the intake passage 3. The turbine 22 transforms the energy of the flow of exhaust gas into rotational energy, and drives the compressor 23 on the same axis using this rotational energy.

A variable nozzle 24 driven by an actuator 25 is installed at the scroll inlet of the turbine 22.

The actuator 25 comprises a diaphragm actuator 26 and a pressure limiting valve 27 which adjusts the control pressure to the diaphragm actuator 26, and it varies the nozzle opening so that a predetermined turbocharging pressure can be obtained in the low rotation speed region of the engine 1. Specifically, at a low rotation speed, the nozzle opening is narrowed so that the flow velocity of exhaust gas introduced into the turbine 22 is increased, and at a high rotation speed, the nozzle opening is widened so that the exhaust gas is introduced into the turbine 22 without resistance.

The pressure limiting valve 27 adjusts the pressure of the diaphragm actuator 26 according to a duty signal from the engine controller 31 so that the opening of the variable nozzle 24 is adjusted to a target nozzle opening.

An intake throttle 42 driven by an actuator 43 is formed in the inlet of the collector part 3a.

The actuator 43 comprises a diaphragm actuator 44 which drives the intake throttle 42 according to the control pressure, and a pressure limiting valve 45 which adjusts the control pressure to the diaphragm actuator 44, according to a duty signal from the engine controller 31 so that the intake throttle 42 has a target opening.

A diesel particulate filter (DPF) 41 which traps particulate matter in the exhaust gas, is installed in the exhaust passage 2 downstream of the turbine 22.

The engine controller 31 comprises a microcomputer provided with a central processing unit (CPU), read-only memory (ROM), random-access memory (RAM) and input/output interface (I/O interface).

The engine controller 31 controls the opening of the EGR valve 6, the fuel injection timing and fuel injection amount of the nozzle 17, the opening of the variable nozzle 24 of the turbocharger 21, and the opening of the intake throttle 42. The particulate matter deposited on the DPF 41 is burned occasionally via these controls, and the DPF 41 is regenerated to the state in which it can again trap particulate matter.

To perform the above control, detection signals from various sensors are inputted into the engine controller 31. These sensors include an accelerator pedal depression sensor 32 which detects a depression amount of an accelerator pedal with which the vehicle is provided, a crank angle sensor 33 which detects a rotation speed Ne and crank angle of the engine 1, a coolant temperature sensor 34 which detects a cooling water temperature of the engine 1, an air flowmeter 35 which detects an intake air amount Qa of the intake passage 2, a differential pressure sensor 36 which detects a differential pressure $\Delta P$ upstream and downstream of the DPF 41, a temperature sensor 37 which detects an exhaust gas temperature T1 at the inlet of the DPF 41, a temperature sensor 38 which detects an exhaust gas temperature T2 at the outlet of the filter 41, and a vehicle speed sensor 51 which detects a running speed of the vehicle.

When the particulate matter deposition amount of the DPF 41 reaches a predetermined amount, the engine controller 31 starts regenerating the DPF 41, burns the particulate matter deposited on the DPF 41, and thereby removes it from the DPF 41.

In the prior art device, as described above, if the exhaust gas temperature during regeneration of the DPF becomes less than the temperature required for regeneration of the DPF, regeneration will be interrupted while particulate matter has deposited locally in the DPF.

Figure 8:
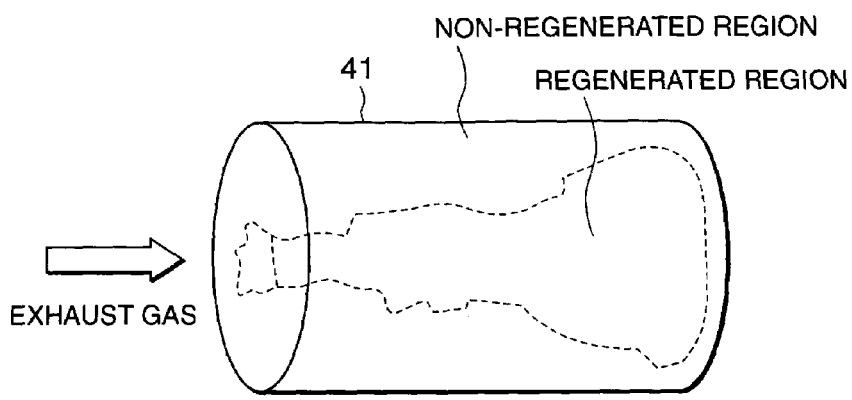
FIG. 8 is a perspective view of a DPF showing a particulate matter deposition state in the DPF when regeneration is interrupted according to the prior art.

Referring to FIG. 8, interrupting regeneration of the DPF causes particulate matter which cannot burn in the upstream circumferential part of the DPF which has a low bed temperature, to remain.

Figure 9:
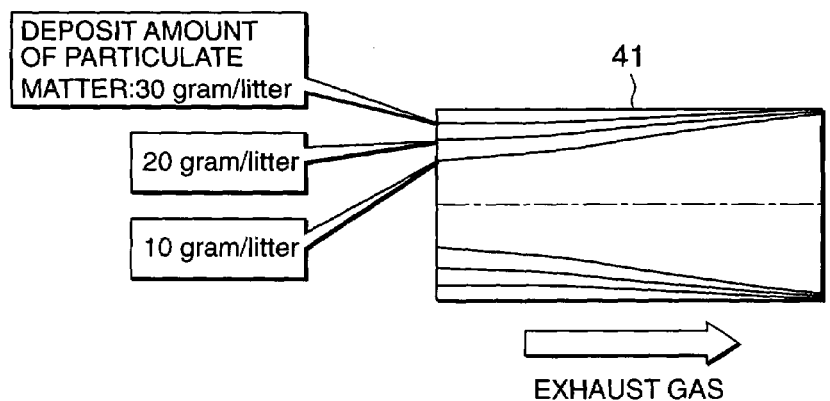
FIG. 9 is a longitudinal sectional view of the DPF showing the distribution of the particulate matter deposition amount during repeated interruption of DPF regeneration according to the prior art.

This part is a non-regenerated region. If regeneration is repeatedly interrupted, as shown in FIG. 9, a large amount of particulate matter will therefore deposit locally.

Figure 10:
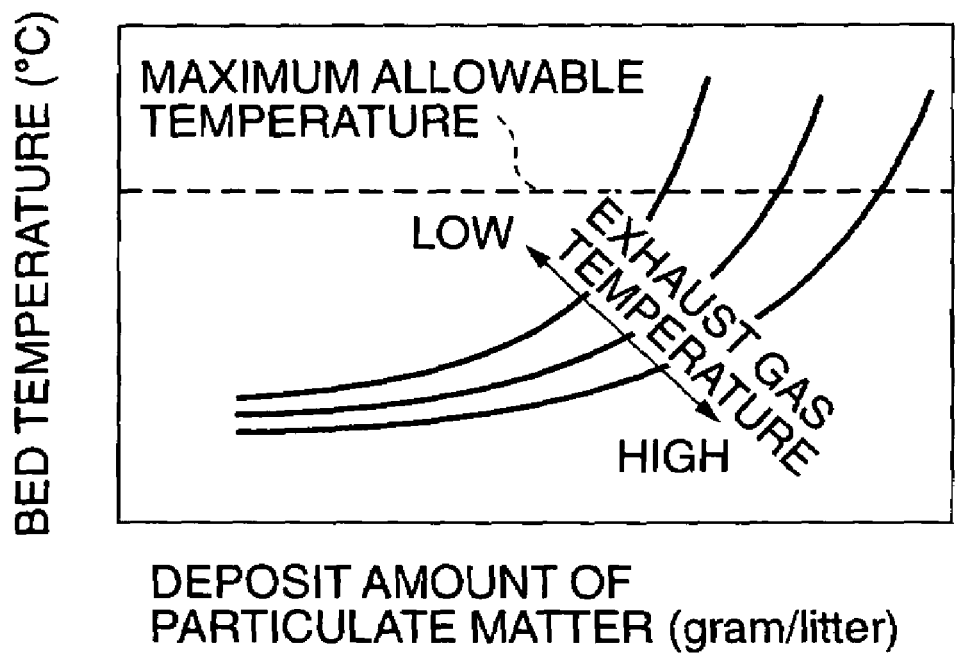
FIG. 10 is a diagram describing the relation of the particulate matter deposition amount, exhaust gas temperature and DPF bed temperature according to the prior art.

Referring to FIG. 10, when the particulate matter deposition amount of the DPF increases, the exhaust gas temperature which reaches the maximum temperature allowed by the DPF, will fall.

In other words, if the particulate matter deposition amount increases, the bed temperature of the DPF will reach the maximum allowable temperature at a lower exhaust gas temperature.

When a large amount of particulate matter deposit locally, the temperature gradient inside the DPF will become large, and as a result, the bed temperature of one part will exceed the maximum allowable temperature, and will have an undesired effect on the heat resistance of the DPF.

To avoid this problem inherent in the prior art device, this invention performs the following control.

The temperature at which the particulate matter trapped by the DPF 41 begin to burn is about 350 degrees centigrade, and the temperature at which particulate matter burns actively is 650 degrees centigrade or more.

The regeneration time required by the DPF 41 is five to ten minutes.

In the following description, the regeneration time required by the DPF 41 during high speed running is taken to be five minutes.

As described above, the running patterns of the vehicle include high speed running, low vehicle speed running as in urban areas, and a running pattern which is intermediate between high speed running and low speed running as in suburban areas. If the regeneration of the DPF is performed uniformly during these different running patterns, the opportunities for interruption of DPF regeneration will inevitably increase.

Thus, the engine controller 31 changes the regeneration mode of the DPF 41 according to the running pattern of the vehicle in order to reduce the opportunities for interrupting regeneration of the DPF 41.

Referring to FIG. 2, the engine controller 31 is provided with a running data logger 52 to recognize the running pattern of the vehicle. The running data logger 52 has a function for storing a time variation of the vehicle speed detected by the vehicle speed sensor 51.

From the stored data in the running data logger 52, the engine controller 31 analyzes the vehicle speed data, and determines the present running pattern of the vehicle.

The engine controller 31 also performs regeneration treatment of the DPF 41 according to the determined running pattern.

Figure 3:
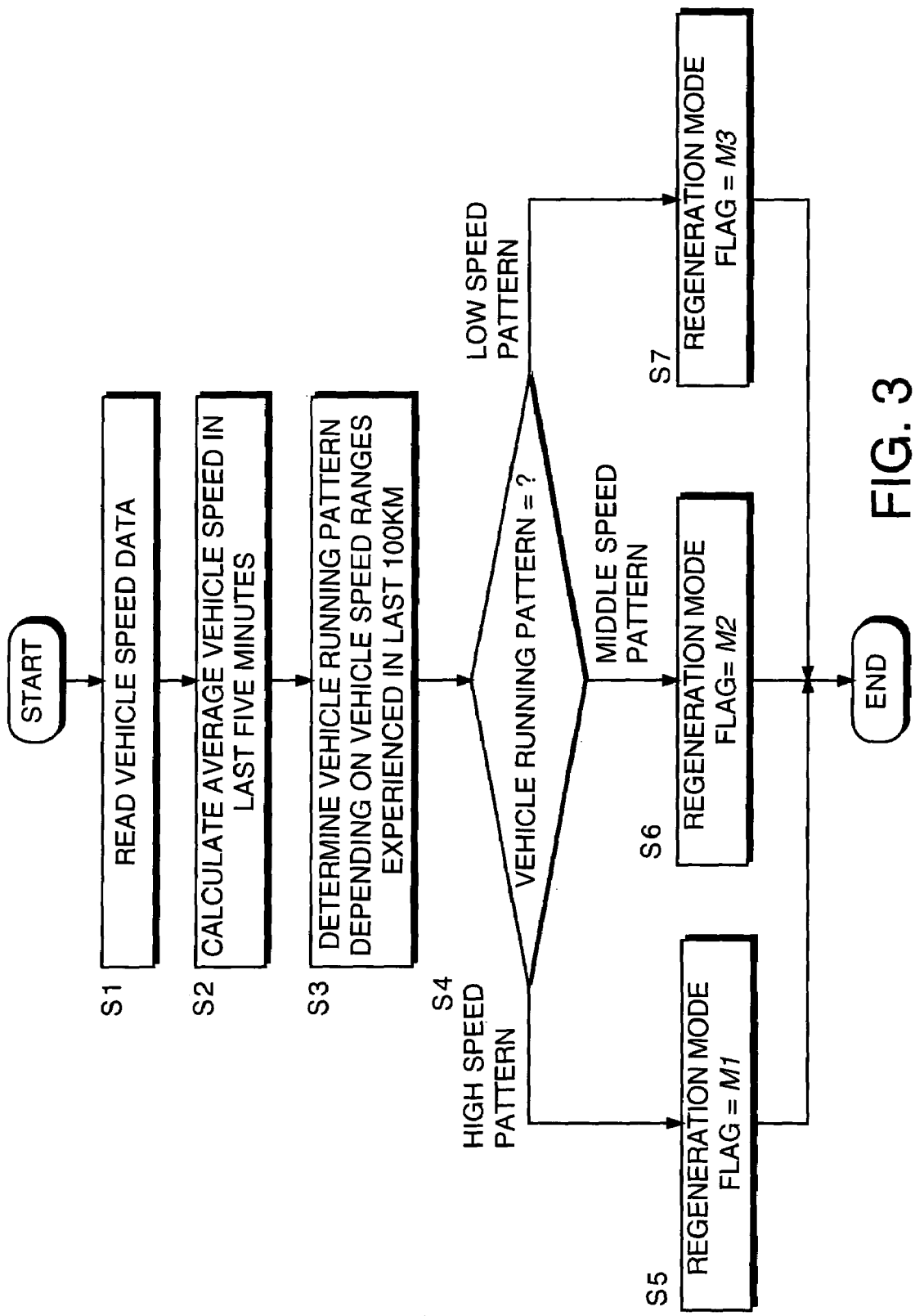
FIG. 3 is a flowchart describing a DPF regeneration mode determining routine executed by an engine controller according to this invention.

Next, referring to FIG. 3, the DPF regeneration mode determination routine executed by the engine controller 31 will be described.

The engine controller 31 executes this routine at an interval of five minutes during running of the vehicle.

The routine execution interval was set at five minutes in order to make it equal to the regeneration time required by the DPF 41 during high speed running.

In a step S1, the engine controller 31 first reads the running data stored by the running data logger 52.

In a step S2, the engine controller 31 calculates the vehicle speed frequency for the last hundred kilometers of running distance from the running data by the methods shown in FIGS. 7A–7D.

Figure 7A:
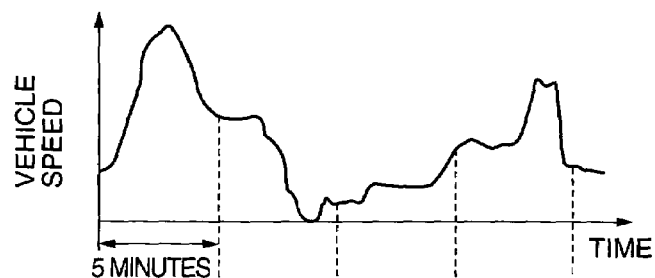
FIGS. 7A–7D are diagrams describing a histogram creation process.

Here, for the purpose of explanation, it is assumed that the relation between time and vehicle speed shown in FIG. 7A is stored by the data logger 52.

Figure 7B:
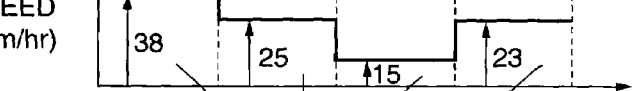
Figure 7C:
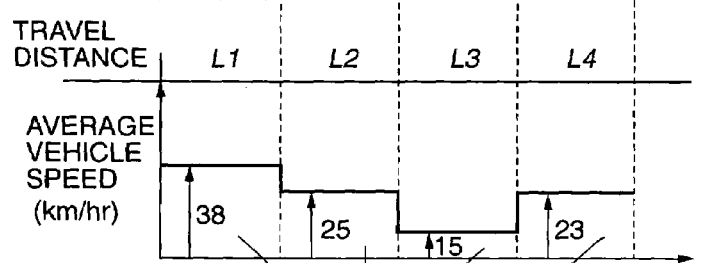

The engine controller 31 divides the vehicle running time into five minute intervals, and from the five minute running distance L1–L4 shown in FIG. 7B, calculates the average vehicle speed for five minutes shown in FIG. 7C. In this diagram, reading from the left, the average vehicle speed is 38 kilometers per hour (km/hr), 25 km/hr, 15 km/hr and 23 km/hr.

Figure 7D:
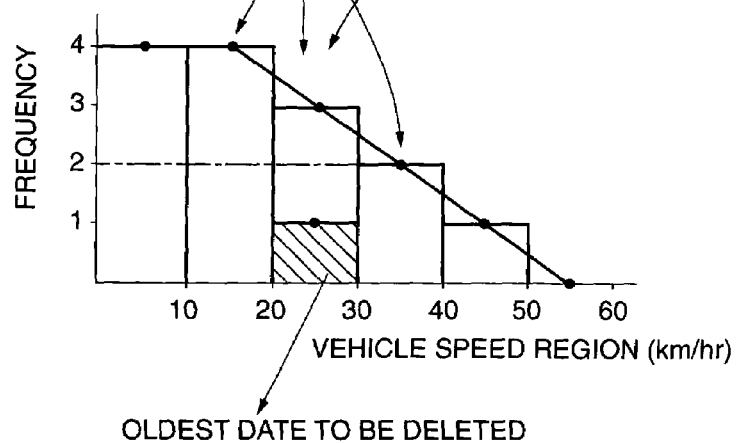

Next, the engine controller 31 classifies the vehicle speed into average vehicle speed regions in ten kilometer units, and as shown in FIG. 7D, displays a histogram of how many times each average vehicle speed region was experienced in a hundred kilometer run.

The horizontal axis of the histogram is average vehicle speed, and the vertical axis is the number of times the average vehicle speed region was experienced in a hundred kilometer run. If the mileage exceeds a hundred kilometers, the engine controller 31 deletes the oldest average vehicle speed data, as shown by the shaded area of FIG. 7D, and updates the histogram using new average vehicle speed data.

Therefore, the histogram always expresses the vehicle speed region distribution per hundred kilometers of newest runs.

On the histogram, if the number of times each average vehicle speed is experienced is connected in a polygonal line, a line graph will be obtained.

Figure 6A:
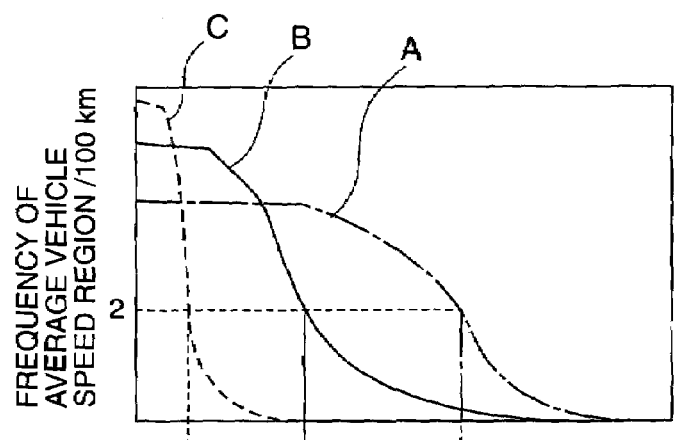

In order to analyze this line graph, the maps shown in FIGS. 6A and 6B are previously prepared.

In FIG. 6A, the horizontal axis expresses average vehicle speed and the vertical axis expresses the frequency of the average vehicle speed region per a hundred kilometer run.

When the vehicle travels at high speed, the line graph varies as shown in Pattern A.

When the vehicle travels through an urban area at low speed, the line graph varies as shown in Pattern B. When the vehicle is traveling through the suburbs, the line graph varies as shown in Pattern C.

On the other hand, as shown in FIG. 6B regeneration mode flags M1–M3 of the DPF 41 are set according to the vehicle speed region. The engine controller 31 calculates the vehicle speed region equivalent to frequency=2 on the newest line graph, and reads the regeneration mode flag corresponding to the vehicle speed region for frequency=2 from the map of FIG. 6B.

Referring again to FIG. 3, the above processing is equivalent to the processing of steps S4–S7.

Specifically, the running pattern representing the latest hundred kilometer running distance is determined in the step S4, and the regeneration mode flag according to the running pattern is set by one of the steps S5–S7.

After the regeneration mode flag is set, the engine controller 31 terminates the routine.

The exhaust emission purification device according to the present invention determines the regeneration mode of the DPF 41 according to the regeneration mode flags M1–M3.

The relation between the regeneration mode flags M1–M3 and the regeneration mode of the DPF 41 is shown in Table-1.

TABLE 1

| | REGENERATION MODE FLAG | | |
|---|---|---|---|
| | M3 | M2 | M1 |
| EXAHUST GAS TEMPERATURE FOR REGENERATION | 400° C. | 550° C. | 550° C. |
| COLLECTION AMOUNT FOR DETERMINING REGENERATION | SMALL (P3) | MEIDUM (P2) | LARGE (P1) |

In Table-1, when the regeneration mode flag is M3 for a low speed running pattern, the target exhaust gas temperature for regeneration of the DPF 41 is set to 400 degrees centigrade, and the particulate matter deposition-amount used as a criterion for starting regeneration is set to a small amount. Specifically, if a differential pressure ΔP exceeds a predetermined differential pressure P3, regeneration of the DPF 41 will be started.

When the regeneration mode flag is M2 for an intermediate speed running pattern, the target exhaust gas temperature for regeneration of the DPF 41 is set to 550 degrees centigrade, and the particulate matter deposition amount used as a criterion for starting regeneration is set to an intermediate amount. Specifically, if the differential pressure ΔP exceeds a predetermined differential pressure P2, regeneration of the DPF 41 will be started.

When the regeneration mode flag is M1 for an intermediate speed running pattern, the target exhaust gas temperature for regeneration of the DPF 41 is set to 550 degrees centigrade, and the particulate matter deposition amount used as a criterion for starting regeneration is set to a large amount. Specifically, if the differential pressure ΔP exceeds a predetermined differential pressure P1, regeneration of the DPF 41 will be started.

In the above setup, the relation of predetermined differential pressures is P1>P2>P3.

The exhaust gas temperature can be increased by any method known in the art such as retarding the fuel injection timing of the nozzle 17, reducing the opening of the intake throttle 42, executing a post injection by the nozzle 17, and retarding the post injection timing.

The difference of the regeneration mode flag M1 and the regeneration mode flag M2 regarding their effect on the regeneration mode of the DPF 41, is the particulate matter deposition amount used as the regeneration start condition.

For the intermediate speed running pattern (B) shown in FIG. 6A, there is a high possibility that the duration of exhaust gas temperature conditions suitable for regeneration of the DPF 41 will be short compared with the high speed running pattern (A).

In the regeneration mode for the intermediate speed running pattern (B), the particulate matter deposition amount used as regeneration start condition of the DPF 41 is set smaller than in the regeneration mode for the high speed running pattern which increases the regeneration frequency of the DPF 41, so the regeneration time on each occasion is shorter than in the regeneration mode for the high speed running pattern (A).

Due to this setting, the possibility that regeneration will be interrupted due to the temperature drop of the DPF 41 in the intermediate speed running pattern (B), can be decreased.

In the other hand, in the case where the regeneration mode flag is M3 for the low speed running pattern (C), the setting of the target exhaust gas temperature to 400 degrees centigrade and the regeneration start deposition amount are determined for the purpose of preventing the particulate matter deposition of the PF41 from increasing from the regeneration start time.

As the exhaust gas temperature is low in the low speed running pattern (C), it is difficult to finish burning all the particulate matter deposited on the DPF 41 in five minutes continuous running. Therefore, in the regeneration mode for the low speed running pattern (C), the exhaust gas temperature is maintained at a target exhaust gas temperature of 400 degrees centigrade at which the particulate matter deposition amount of the DPF 41 does not increase, and after the vehicle shifts to the intermediate speed running pattern (B) or high speed running pattern (A), regeneration of the DPF 41 is performed. Hence, in the low speed running pattern (C), simply by suppressing the increase in particulate matter so that regeneration of the DPF 41 is effectively not performed, the opportunity for interrupting regeneration of the DPF 41 due to a drop of the exhaust gas temperature which is particularly frequent in the low speed running pattern (C), can be reduced to zero.

On the other hand, in the low speed running pattern (C), in order that the particulate matter deposition amount of the DPF 41 does not increase due to rise of exhaust gas temperature, the engine controller 31 controls the amount of particulate matter flowing into the DPF 41 parallel to the control of exhaust gas temperature. The amount of particulate matter flowing into the DPF 41 can be reduced by controlling the smoke generation amount of the engine 1.

As a method for suppressing the smoke generation amount, any of the methods known in the art may be applied such as reducing the EGR amount by decreasing the opening of the EGR valve 6, reducing a pilot injection amount of the nozzle 17, expanding the pilot injection interval, and intensifying swirl via a swirl control valve.

Figure 4:
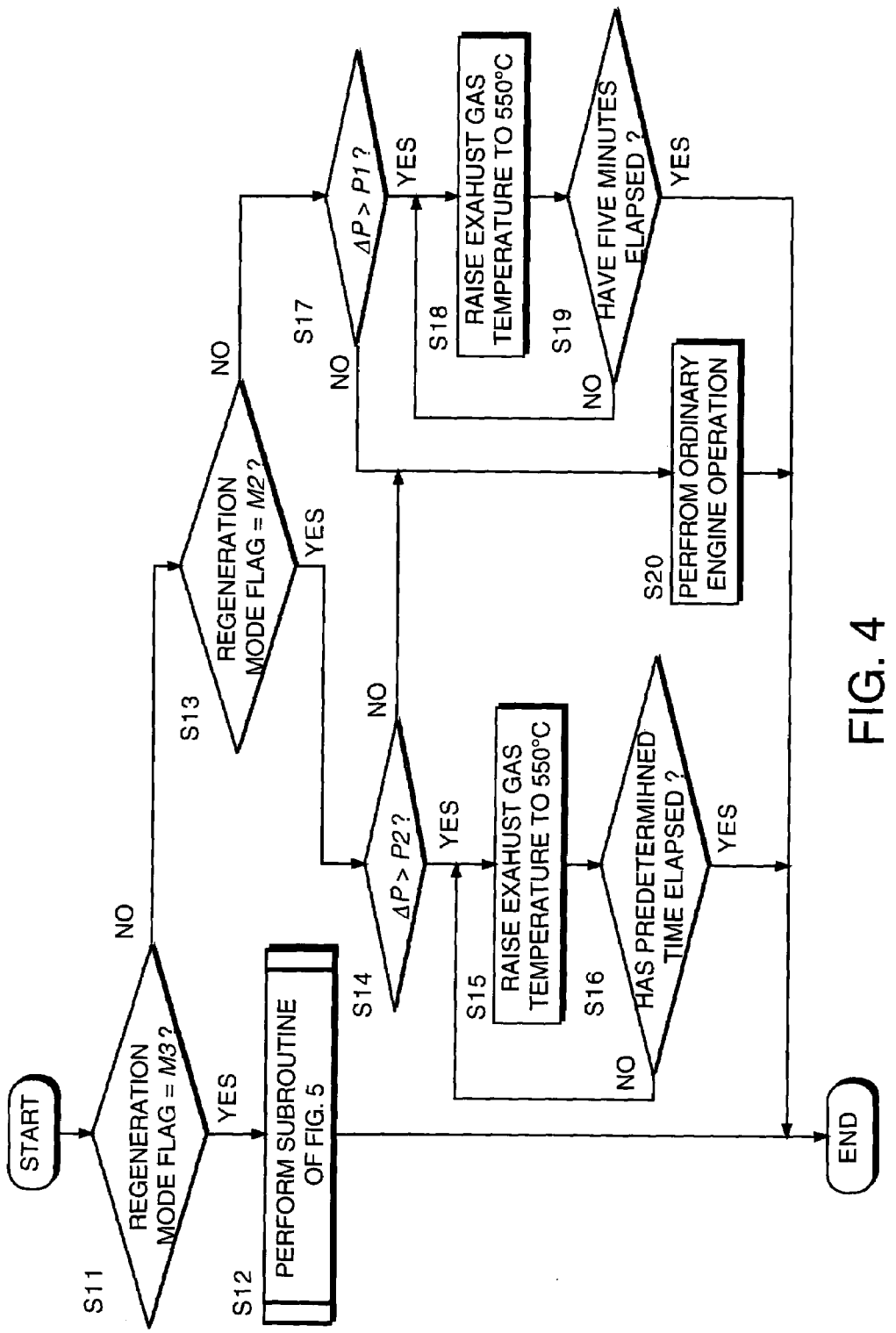
FIG. 4 is a flowchart describing a DPF regeneration routine executed by the engine controller.

Now, referring to FIG. 4, the DPF regeneration routine executed by the engine controller 31 to achieve regeneration of the DPF 41 specified in Table-1, will be described, This routine is started when the regeneration mode setting routine of FIG. 3 terminates.

The engine controller 31, first in a step S11, determines whether or not the regeneration mode flag is M3 for the low speed running mode.

If the regeneration mode flag is not M3, in a step S13, the engine controller 31 determines whether or not the regeneration mode flag is M2 for the intermediate speed running mode.

When the regeneration mode flag is not M2, the regeneration mode flag is M1 for the high speed running pattern.

In this case, the engine controller 31, in a step S17, determines whether or not the differential pressure ΔP detected by the differential pressure sensor 36 has exceeded the predetermined differential pressure P1. When the differential pressure ΔP has not exceeded the predetermined differential pressure P1, regeneration of the DPF 41 is unnecessary. In this case, the engine controller 31, in a step S20, performs ordinary engine control which does not take account of regeneration of the DPF 41, and terminates the routine. When the differential pressure ΔP has exceeded the predetermined differential pressure P1 in the step S17, in a step S18, the engine controller 31, by applying one of the above-mentioned exhaust gas temperature increase methods, performs engine control for raising the exhaust gas temperature to the target exhaust gas temperature of 550 degrees centigrade.

In a following step S19, the engine controller 31 determines whether or not an elapsed time from start of regeneration of the DPF 41, i.e., from the first execution of the step S18, has reached five minutes. When the elapsed time has reached five minutes, the routine is terminated.

When the elapsed time has not reached five minutes, the processing of the steps S18 and S19 is repeated.

Hence, when the regeneration mode flag is M1 for the high speed running pattern, if it is determined that the DPF 41 requires regeneration, regeneration treatment will be performed over five minutes.

In the step S13, when the regeneration mode flag is M2 for the intermediate speed running pattern, the engine controller 31 determines in the step S14 whether or not the differential pressure ΔP detected by the differential pressure sensor 36 has exceeded the predetermined differential pressure P2. When the differential pressure ΔP has not exceeded the predetermined differential pressure P2, regeneration of DPF 41 is unnecessary. In this case, the engine controller 31, in the aforesaid step S30, performs ordinary engine control which does not take account of regeneration of the DPF 41, and terminates the routine.

When the differential pressure ΔP has exceeded the predetermined differential pressure P2 in the step S14, in a step S15, the engine controller 31 performs engine control for raising the exhaust gas temperature to the target exhaust gas temperature of 550 degrees centigrade.

This control is identical to the control of the step S18.

In the following step S16, it is determined whether or not the elapsed time from start of regeneration of the DPF 41, i.e., the first execution of the step S15, has reached a predetermined time. Here, the predetermined time is the regeneration time required by the DPF 41.

Although in the regeneration mode for the high speed operation pattern, the regeneration time required by the DPF 41 is set to five minutes, in the regeneration mode for the intermediate speed running pattern, the predetermined differential pressure P2 of the regeneration start conditions is set lower than the predetermined differential pressure P1 for the high speed running pattern, so there is a smaller particulate matter deposition amount when regeneration starts. Therefore, regeneration is completed in a shorter time than five minutes. The predetermined time is therefore a smaller value than five minutes, but as it depends on the predetermined differential pressure P2, it is desirable to set it experimentally.

When the elapsed time reaches the predetermined time in the step S16, the engine controller 31 terminates the routine. When the elapsed time does not reach the predetermined time, the engine controller 31 repeats the processing of the steps S15 and S16.

Thus, when the regeneration mode flag is M2 for the intermediate speed running pattern, if it is determined that regeneration of the DPF 41 is required, regeneration treatment will be performed over the predetermined time.

Figure 5:
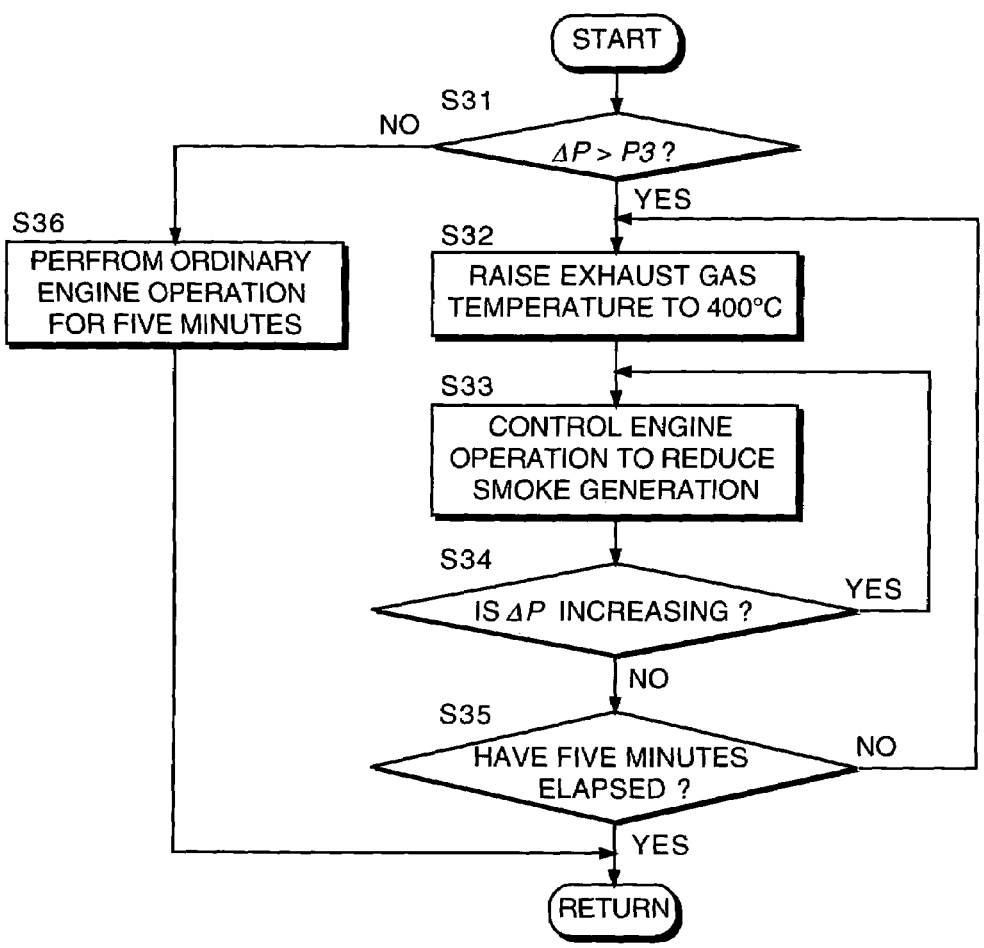
FIG. 5 is a flowchart describing a DPF regeneration subroutine executed by the engine controller under a low speed running pattern.

In the step S11, when the regeneration mode flag is M1 for the low speed running pattern, the engine controller 31, in the step S12, performs the DPF regeneration subroutine shown in FIG. 5 for the low speed running pattern.

Referring to FIG. 5, the engine controller 31 first determines whether or not the differential pressure $\Delta P$ detected by the differential pressure sensor 36 detected in the step S31 has exceeded the predetermined differential pressure P3. When the differential pressure $\Delta P$ has not exceeded the predetermined differential pressure P3, the particulate matter deposition amount of the DPF 41 is small.

In this case, the engine controller 31, in a step S36, performs ordinary engine control which does not take account of regeneration of the DPF 41, and terminates the routine. The processing of the step S36 is identical to the processing of the step S20.

When the differential pressure $\Delta P$ has exceeded the predetermined differential pressure P3 in the step S31, the engine controller 31 processes steps S32–S35.

In the step S32, the engine controller 31, by applying one of the above-mentioned exhaust gas temperature increase methods, performs engine control for raising the exhaust gas temperature to the target exhaust gas temperature of 400 degrees centigrade.

In the following step S33, the engine controller 31, by applying one of the above-mentioned methods, performs engine control to suppress the smoke generation amount of the diesel engine 1.

In the following step S34 it is determined whether or not the engine controller 31 is increasing the differential pressure $\Delta P$. In order to determine whether or not the differential pressure $\Delta P$ is increasing, the engine controller 31 stores the differential pressure $\Delta P$ in a RAM.

The engine controller 31 determines whether or not the differential pressure $\Delta P$ is increasing by comparing the differential pressure $\Delta P$ detected by the differential pressure sensor 36 with the stored value. When the differential pressure $\Delta P$ is increasing, the engine controller 31 repeats the processing of the steps S33 and S34 until the increase in differential pressure $\Delta P$ stops.

If the exhaust gas temperature is raised, the particulate matter in the DPF 41 will burn, but the particulate matter generation amount of the diesel engine 1 will also increase. Therefore, in steps S32–S34, by performing control which reduces the smoke generation amount parallel to the control which raises exhaust gas temperature, the particulate matter amount removed from the DPF 41 by combustion and the particulate matter amount newly flowing into the DPF 41 are balanced.

As a result, if the increase in differential pressure $\Delta P$ stops, the engine controller 31, in the step S35, determines whether or not the elapsed time from the first execution of the step S32 has reached five minutes. When the elapsed time has reached five minutes, the engine controller 31 terminates the subroutine. As a result, the DPF regeneration routine of FIG. 4 is also terminated.

When the elapsed time has not reached five minutes, the engine controller 31 repeats and performs the processing of the step S32–S35 until the elapsed time reaches five minutes.

Thus, when the regeneration mode flag is M3 for the low speed running pattern and it is determined that the DPF 41 needs to be regenerated, processing for not increasing the particulate matter deposition amount is performed over five minutes.

As mentioned above, this invention changes the regeneration mode of the DPF 41 according to the vehicle running pattern. Therefore, the regeneration performed is suited to the running pattern and there is less possibility that regeneration of DPF 41 will be interrupted by a drop of exhaust gas temperature.

The contents of Tokugan 2003-007939, with a filing date of Jan. 16, 2003 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, according to this embodiment, the regeneration time required of the DPF 41 during high speed running is assumed to be five minutes. However, as the regeneration time required by the DPF 41 during high speed running is different depending on the setting of the predetermined differential pressure P1 and the specification of the DPF 41, it is preferred to determine the regeneration time required by the DPF 41 experimentally.

Also, according to this embodiment, the execution intervals of the DPF regeneration mode setting routine and the DPF regeneration routine are set equal to the regeneration time required by the DPF 41 during high speed running. This is based on the assumption that the time required for calculation and determination in each routine is basically zero. However, the routine execution interval may be determined considering the time required for calculation and determination.

In the above embodiment, the parameters required for control are detected using sensors, but this invention can be applied to any regeneration device which can perform the claimed control using the claimed parameters regardless of how the parameters are acquired. Further, in the above embodiment, the controller is constituted by a single microcomputer, but it may be constituted by plural microcomputers.

The embodiments of this invention in which an exclusive property or privilege is claimed are defined as follows:

What is claimed is:

1. A regeneration device for a filter which traps particulate matter in the exhaust gas of a vehicle diesel engine, comprising:
   a sensor which detects a vehicle running condition;
   an exhaust gas temperature increasing mechanism which increases a temperature of the exhaust gas; and
   a programmable controller programmed to:
   determine a vehicle running pattern from the vehicle running condition;
   determine a target temperature of the exhaust gas during regeneration of the filter according to the vehicle running pattern; and
   control the exhaust gas temperature increasing mechanism to increase the exhaust gas temperature to the target temperature when regeneration of the filter is performed.

2. The regeneration device as defined in claim 1, wherein the vehicle running condition detecting sensor comprises a sensor which detects a vehicle speed.

3. The regeneration device as defined in claim 2, wherein the controller is further programmed to determine the running pattern based on an average vehicle speed for each unit time within a predetermined vehicle travel distance.

4. The regeneration device as defined in claim 3, wherein the controller is further programmed to store a plurality of average speeds in succession within the predetermined vehicle travel distance as samples, classify the samples into predetermined vehicle speed regions, and determine the running pattern based on a specific vehicle speed region which holds a specific number of the samples.

5. The regeneration device as defined in claim 2, wherein the regeneration device further comprises a sensor which detects a particulate matter collection amount in the filter, and the controller is further programmed to determine whether or not the particulate matter collection amount exceeds a predetermined amount set according to the running pattern, and when the particulate matter collection amount exceeds the predetermined amount set according to the running pattern, control the exhaust gas temperature increasing mechanism to increase the exhaust gas temperature to a target temperature set according to the running pattern.

6. The regeneration device as defined in claim 5, wherein the running pattern comprises a low speed pattern which corresponds to a first specific vehicle speed region and a high speed pattern which corresponds to a second specific vehicle speed region which is faster than the first specific vehicle speed region, and the controller is further programmed to set the target temperature of the low speed pattern to be lower than the target temperature of the high speed pattern.

7. The regeneration device as defined in claim 6, wherein the controller is further programmed to set the predetermined amount applied in the low speed pattern to be less than the predetermined amount applied in the high speed pattern.

8. The regeneration device as defined in claim 7, wherein the regeneration device further comprises a smoke reduction mechanism which reduces a smoke generation amount of the diesel engine, and the controller is further programmed to control the smoke reduction mechanism to reduce the smoke generation amount when the exhaust gas temperature increasing mechanism is controlled to increase the exhaust gas temperature in the low speed pattern.

9. The regeneration device as defined in claim 8, wherein the controller is further programmed to control the smoke reduction mechanism to cancel out an increase in the particulate matter collection amount due to control of the exhaust gas temperature increasing mechanism to increase the temperature of the exhaust gas to the target temperature.

10. The regeneration device as defined in claim 7, wherein, the running pattern further comprises an intermediate speed pattern situated between the low speed and high speed pattern, and the controller is further programmed to set the predetermined amount applied in the intermediate speed pattern to be larger than the predetermined amount applied to the low speed pattern, and smaller than the predetermined amount applied to the high speed pattern.

11. The regeneration device as defined in claim 1, wherein the controller is further programmed to control the exhaust gas temperature increasing mechanism to maintain the exhaust gas temperature at the target temperature for a predetermined time after controlling the exhaust gas temperature increasing mechanism to increase the exhaust gas temperature to the target temperature.

12. A regeneration device for a filter which traps particulate matter in the exhaust gas of a vehicle diesel engine, comprising:

means for determining a vehicle running condition;

means for increasing a temperature of the exhaust gas;

means for determining a vehicle running pattern from the vehicle running condition;

means for determining a target temperature of the exhaust gas during regeneration of the filter according to the vehicle running pattern; and means for controlling the exhaust gas temperature increase means to increase the exhaust gas temperature to the target temperature when regeneration of the filter is performed.

13. A regeneration method of a filter which traps particulate matter in the exhaust gas of a vehicle diesel engine, the engine comprising an exhaust gas temperature increasing mechanism which increases a temperature of the exhaust gas, the method comprising:

determining a vehicle running condition;

determining a vehicle running pattern from the vehicle running condition;

determining a target temperature of the exhaust gas during regeneration of the filter according to the vehicle running pattern; and controlling the exhaust gas temperature increasing mechanism to increase the exhaust gas temperature to a target temperature according to the vehicle running pattern.

* * * * *